(12) United States Patent
Ezura

(10) Patent No.: US 7,040,668 B2
(45) Date of Patent: May 9, 2006

(54) TUBE JOINT

(75) Inventor: Takumi Ezura, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/117,085

(22) Filed: Apr. 8, 2002

(65) Prior Publication Data
US 2003/0173779 A1 Sep. 18, 2003

(30) Foreign Application Priority Data
Mar. 18, 2002 (JP) .............................. 2002-074861

(51) Int. Cl.
*F16L 37/00* (2006.01)
(52) U.S. Cl. ...................................... 285/308; 285/921
(58) Field of Classification Search ................ 285/285, 285/239, 308, 140.1, 192, 203, 204, 332.2, 285/921, 331, 133.11, 133.21, 148.19, 148.21, 285/240
See application file for complete search history.

(56) References Cited

U.S. PATENT DOCUMENTS

| | | | |
|---|---|---|---|
| 2,676,037 A * | 4/1954 | Mueller | 285/148.28 |
| 3,588,149 A * | 6/1971 | Demler | 285/921 |
| 3,784,235 A * | 1/1974 | Kessler et al. | 285/94 |
| 4,712,809 A * | 12/1987 | Legris | 285/239 |
| 4,946,204 A * | 8/1990 | Boticki | 285/921 |
| 4,970,863 A * | 11/1990 | Cunningham | 285/921 |
| 5,997,049 A * | 12/1999 | Kingsford et al. | 285/331 |
| 6,499,772 B1* | 12/2002 | Minemyer | 285/308 |
| 2001/0045748 A1* | 11/2001 | Muto | 285/308 |

FOREIGN PATENT DOCUMENTS

DE    100 05 870 A1    8/2000

* cited by examiner

*Primary Examiner*—Aaron Dunwoody
(74) *Attorney, Agent, or Firm*—Paul A. Guss

(57) ABSTRACT

A tube joint comprises a body composed of a resin material, a connecting member installed to one end of the body, an insert section inserted into the body, a first deformable section with a reduced diameter as compared with the insert section, and a second deformable section with a further reduced diameter as compared with the first deformable section. A fluid tube, to which a pressure fluid is supplied, is inserted into the other end of the body.

8 Claims, 11 Drawing Sheets

TUBE JOINT

BACKGROUND OF THE INVENTION

1. Field of the Invention

The present invention relates to a tube joint for connecting, for example, a fluid tube for introducing or discharging a fluid.

2. Description of the Related Art

A tube joint has been hitherto used for fluid piping of a brake used in a vehicle such as an automobile, in order to connect fluid pipes into which a pressure fluid for driving the brake is introduced. As shown in FIG. 11, such a tube joint 1 comprises a connecting section 3 which has one end to be connected to a port 2 of a pressure fluid-operated apparatus or the like, a main body 4 which is integrally connected to the other end of the connecting section 3, and a fluid pipe 5 which is inserted into an end opposite to the connecting section 3 of the main body 4. The connecting section 3 is made of a metal material with one end screw-engaged with the port 2 and integrally fixed thereto. The other end of the connecting section 3 has substantially the constant diameter, and is inserted into the main body 4. An O-ring 6 is installed to an annular groove on the outer circumference of the other end of the connecting section 3. The air-tightness in the main body 4 and the connecting section 3 is maintained by the O-ring 6.

The port 2 of the pressure fluid-operated apparatus or the like, to which the connecting section 3 is connected, is generally formed of a metal material. When external force is applied, for example, to the fluid piping 5 and the tube joint 1, the connecting section 3 may be broken by the load applied to the connecting portion of the connecting section 3 if the connecting section 3 is formed of a resin material. Further, the screw formed on the connecting section 3 may be abraded by repeated attachment to and detachment from the port 2. Therefore, the connecting section 3 is generally to formed of a metal material in order to increase the strength.

The main body 4 is formed of a resin material in order to realize a light weight. The end of the main body 4, to which the connecting section 3 is connected, has substantially the same diameter for the outer circumference and the inner circumference.

The tube joint 1 is fixed in a state of cantilever in which only one end of the connecting section 3 is supported by the port 2. The tube joint 1 and the fluid pipe 5 used in the brake are generally provided on the floor surface of a vehicle such as an automobile so that they are opposed to a road surface.

As for the conventional tube joint 1, for example, unexpected external force (see the arrow A in FIG. 11) is sometimes applied to the fluid piping 5 of the main body 4, for example, by pebbles or gravels from the road surface. In such a situation, the main body 4 is deformed downwardly by the external force about the connecting portion between the main body 4 and the connecting section 3, because the main body 4 is formed of the resin material. However, the connecting section 3, to which the main body 4 is coupled, is not deformed because the connecting section 3 is formed of the metal material and is completely fixed to the port 2. As a result, stress is generated from the outer circumferential surface to the inner circumference of the main body 4 near the connecting portion of the main body 4 and the connecting section 3. The main body 4 may be broken near the connecting portion.

SUMMARY OF THE INVENTION

A general object of the present invention is to provide a tube joint which makes it possible to reduce the stress on a joint body when external force is applied to the joint body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
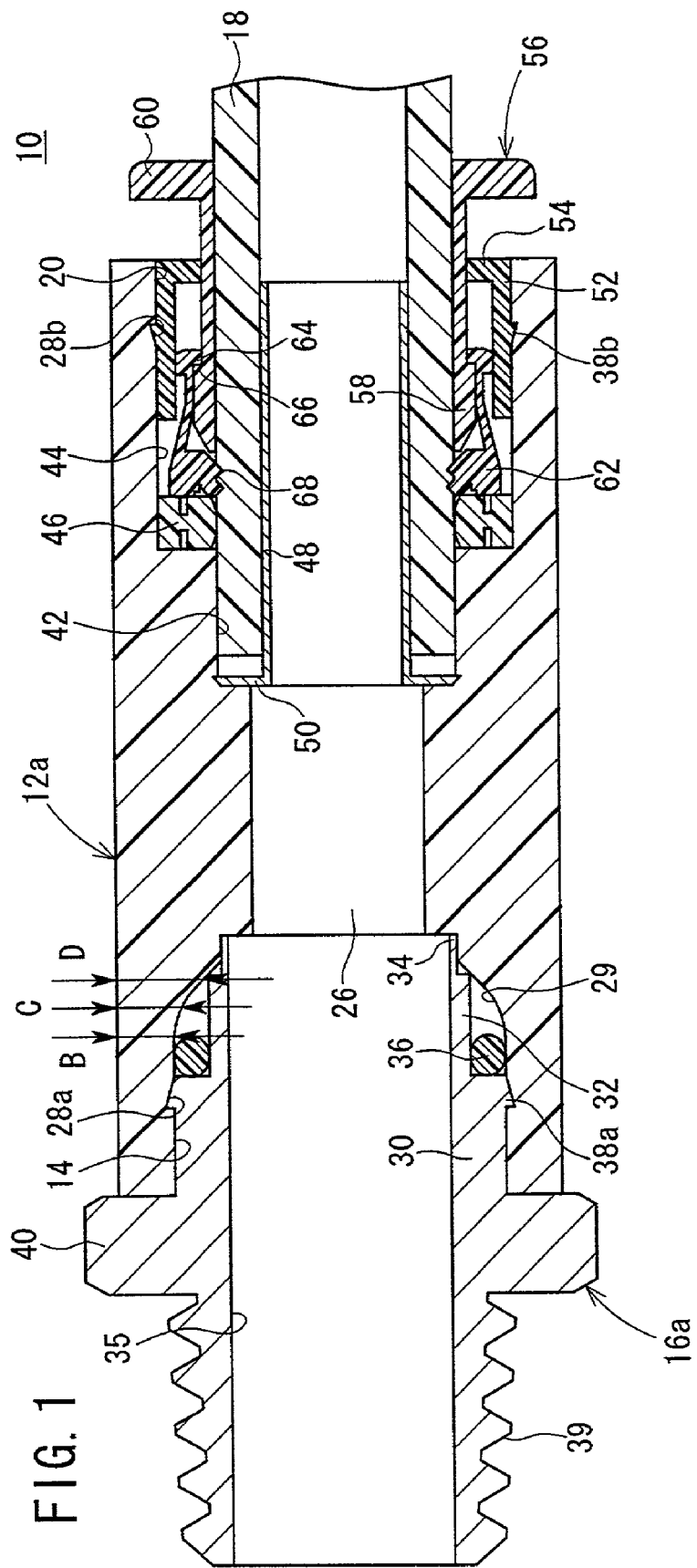
FIG. 1 is a longitudinal sectional view illustrating a tube joint of a first embodiment according to the present invention.

With reference to FIG. 1, a tube joint 10 according to a first embodiment of the present invention has a cylindrical body (joint body) 12a which is composed of a resin material, and a connecting member (fixing member) 16a which is integrally screwed in a first opening 14 disposed at one end of the body 12a. A second opening 20 for inserting a fluid tube 18 composed of a resin material is provided at the other end of the body 12a.

A communicating passage 26, which has a diameter smaller than those of the first and second openings 14, 20 and which makes communication between the first and second openings 14, 20, is formed at a central portion to extend by a predetermined length in the body 12a.

An annular engaging groove 28a is formed on an inner circumferential surface 29 of the first opening 14. One end of the connecting member 16a engages the engaging groove 28a. The inner circumferential surface 29 of the body 12a has a gentle circular arc-shaped cross section so that the diameter of the inner circumferential surface 29 is gradually reduced from the vicinity of the engaging groove 28a toward the communicating passage 26. As a result, the wall thicknesses B, C, D of the body 12a in the axial direction of the body 12a are gradually thickened in this order toward the center (wall thickness B<wall thickness C<wall thickness D).

An insert section 30 which has substantially the same diameter as that of the first opening 14, a first deformable section 32 which has an outer circumferential diameter smaller that of the outer circumferential surface of the insert section 30, and a second deformable section 34 which has a diameter further smaller than that of the first deformable section 32 are formed in this order toward a forward end of the connecting member 16a which is composed of a metal material. The first and second deformable sections 32, 34 serves as a mechanism for mitigating the stress generated at the connecting portion between the body 12a and the connecting member 16a when any external force is applied to the outer circumferential surface of the body 12a.

A passage 35, which is formed in the connecting member 16a, communicates with a port 41 (see FIG. 2) of a fluid pressure-operated apparatus 37 and the communicating passage 26 of the body 12a. The inner circumferential surface of the passage 35 has substantially the same diameter. Therefore, the first and second deformable sections 32, 34 are gradually thinned in this order toward the forward end of the connecting member 16a. One end of the connecting member 16a is gradually thinned, while the body 12a is gradually thickened in the axial direction of the body 12a. The thick inner circumferential surface 29 of the body 12a abuts against the outer circumferential surface of the second deformable section 34.

Two steps of the annular first and second deformable sections 32, 34 are formed at one end of the connecting member 16a. A plurality of steps gradually thinned toward the forward end may also be formed.

A seal member 36 is interposed between the inner circumferential surface 29 of the body 12a and the first deformable section 32. The air tightness in the connecting member 16a and the body 12a is retained by the seal member 36. A projection 38a, which protrudes radially outwardly, is formed on the outer circumference of the insert section 30. The projection 38a engages the engaging groove 28a of the first opening 14. Accordingly, the body 12a and the connecting member 16a are connected to one another in an integrated manner.

A screw 39 is engraved at the other end of the connecting member 16a which is connected to the fluid pressure-operated apparatus 37. A hexagonal pillar-shaped tightening section 40, which is formed between the other end and the insert section 30 of the connecting member 16a, is rotated by using an unillustrated tool or the like, and thus the connecting member 16a is integrally screwed in the port 41 (see FIG. 2) of the pressure fluid-operated apparatus 37.

A first step 42 and a second step 44, which are disposed in this order from the communicating passage 26 toward the second opening 20, are formed at the other end of the body 12a which has the second opening 20. A packing 46, which protrudes by a predetermined length toward the inner circumference, is installed to the second step 44 which has a diameter larger than that of the first step 42.

The first step 42 engages a flange 50 of a cylindrical sleeve 48. Accordingly, the sleeve 48 is prevented from disengagement from the body 12a. The fluid tube 18 is inserted on the outer circumference of the sleeve 48. The sleeve 48 guides the disengaged fluid tube 18.

An annular guide member 52 is inserted into the second opening 20 of the body 12a. A guide section 54, which protrudes radially inwardly at one end of the guide member 52, abuts against the outer circumferential surface of a release bush 56 so that the guide member 52 is supported thereby. A projection 38b formed on the outer circumference of the guide section 54 engages an engaging groove 28b formed on the inner circumferential surface of the second opening 20 of the body 12a. Accordingly, the guide member 52 is prevented from disengagement from the body 12a.

A part of the release bush 56 is inserted into the guide member 52. A plurality of unillustrated slits are separated from each other by predetermined angles in the circumferential direction at one end of the release bush 56. A forward end 58, which is expanded by a predetermined length radially outwardly and which has its gradually reduced diameter, is formed at one end of the release bush 56.

A flange 60, which protrudes radially outwardly, is formed at the other end of the release bush 56. The inner circumferential diameter of the release bush 56 is slightly larger than the outer circumferential diameter of the fluid tube 18 to be inserted therein.

A chuck 62 formed from a pressed thin plate is installed between the inner circumferential surface of the guide member 52 and the outer circumferential surface of the release bush 56.

An engaging section 64, which protrudes at one end of the chuck 62, abuts against the outer circumferential surface of the release bush 56. A step 66 at the forward end 58 of the release bush 56 and the end of the engaging section 64 of the chuck 62 are engaged in the longitudinal direction of the body 12a. Therefore, the release bush 56 is prevented from disengagement from the body 12a.

A fastening pawl 68, which protrudes by a predetermined length radially inwardly, is formed at the other end of the chuck 62. The fastening pawl 68 is pierced into the outer circumferential surface of the fluid tube 18. Accordingly, the fluid tube 18 is prevented from disengagement from the body 12a.

The diameter of the fastening pawl 68 of the chuck 62 is elastically expandable and contractible.

The tube joint 10 according to the first embodiment of the present invention is basically constructed as described above. Next, its operation, function, and effect will be explained.

Figure 2:
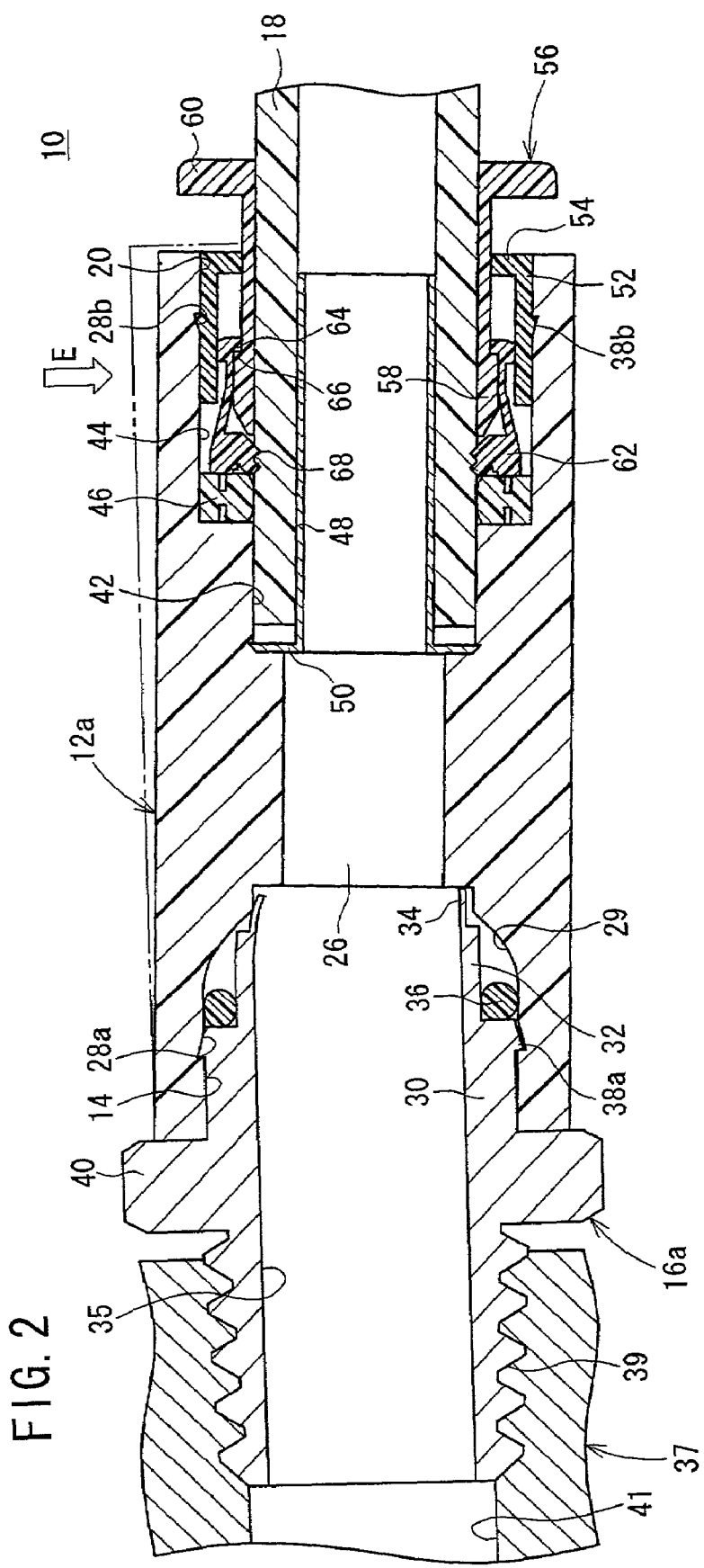
FIG. 2 is a longitudinal sectional view in which external force is applied to the tube joint shown in FIG. 1.

It is assumed that, as shown in FIG. 2, one end of the connecting member 16a of the tube joint 10 is screwed in the port 41 of the fluid pressure-operated apparatus 37 or the like.

When any force (hereinafter referred to as "external force", see the arrow E in FIG. 2) is applied from the outside to the other end of the body 12a, the other end of the body 12a for installing the fluid tube 18 is deformed downwardly about the support point near the connecting portion at one end at which the body 12a composed of the resin material is connected to the connecting member 16a. The second deformable section 34 is thin at the forward end of the connecting member 16a completely fixed to the port 41. Therefore, the second deformable section 34 is deformed downwardly under the pressing action of the inner circumferential surface of the body 12a which abuts against the second deformable section 34. The first deformable section 32 is deformed downwardly in conformity with the second deformable section 34.

That is, the second deformable section 34 and the first deformable section 32 at the forward end of the connecting member 16a are thinner than the insert section 30. Accordingly, the forward end of the connecting member 16a is deformable by the pressing force to be applied under the deforming action of the body 12a.

Further, the body 12a is gradually thickened toward the second opening 20. Accordingly, the strength of the body 12a made of resin is increased against the external force applied to the body 12a.

As a result, when the body 12a is deformed by the external force applied to the body 12a, then the first and second deformable sections 32, 34 of the connecting member 16a inserted into the body 12a are deformed, and no obstacle arises when the connecting member 16a is deformed in the downward direction of the body 12a. Therefore, the stress generated near the connecting portion between the body 12a and the connecting member 16a is mitigated. The external force, which is applied to the body 12a, is absorbed in a well-suited manner.

In the first embodiment, explanation is made for the case in which the external force (arrow E) is applied in the downward direction to the other end of the body 12a as shown in FIG. 2. However, even when the external force is applied in any direction to the outer circumferential surface, for example, upwardly to the other end of the body 12a, the stress generated near the connecting portion between the body 12a and the connecting member 16a can be mitigated. Further, the external force applied to the body 12a can be also preferably absorbed.

Finally, after the external force is applied to the body 12a, the body 12a composed of the resin material is restored under the elastic action to the shape (see FIG. 1) before the external force is applied. In this situation, one end is plastically deformed in the downward direction of the body 12a under the pressing action of the body 12a, and one end is retained in a slightly deformed state even after the deformation (see FIG. 2), because the connecting member 16a is formed of the plastic metal material. Although one deformed end slightly protrudes to the communicating passage 26 of the body 12a, the function is not deteriorated as the tube joint 10 for communicating therein the fluid.

When the connecting member 16a is formed of an elastic metal material, it is possible to restore the connecting member 16a to have the substantially same shape as the shape before being pressed, after one end is deformed under the pressing action of the body 12a.

As a result, even after the external force is applied to the body 12a, the tube joint 10 can be used without deteriorating any function as the tube joint 10.

As described above, in the first embodiment, when the external force is applied to the body 12a, the external force is absorbed for the deformation of the body 12a by downwardly deforming the first and second deformable sections 32, 34 of the connecting member 16a. Therefore, it is possible to mitigate the stress generated at the connecting portion between the body 12a and the connecting member 16a. As a result, the durability of the body 12a is not affected. Therefore, it is possible to improve the durability of the tube joint 10.

Figure 3:
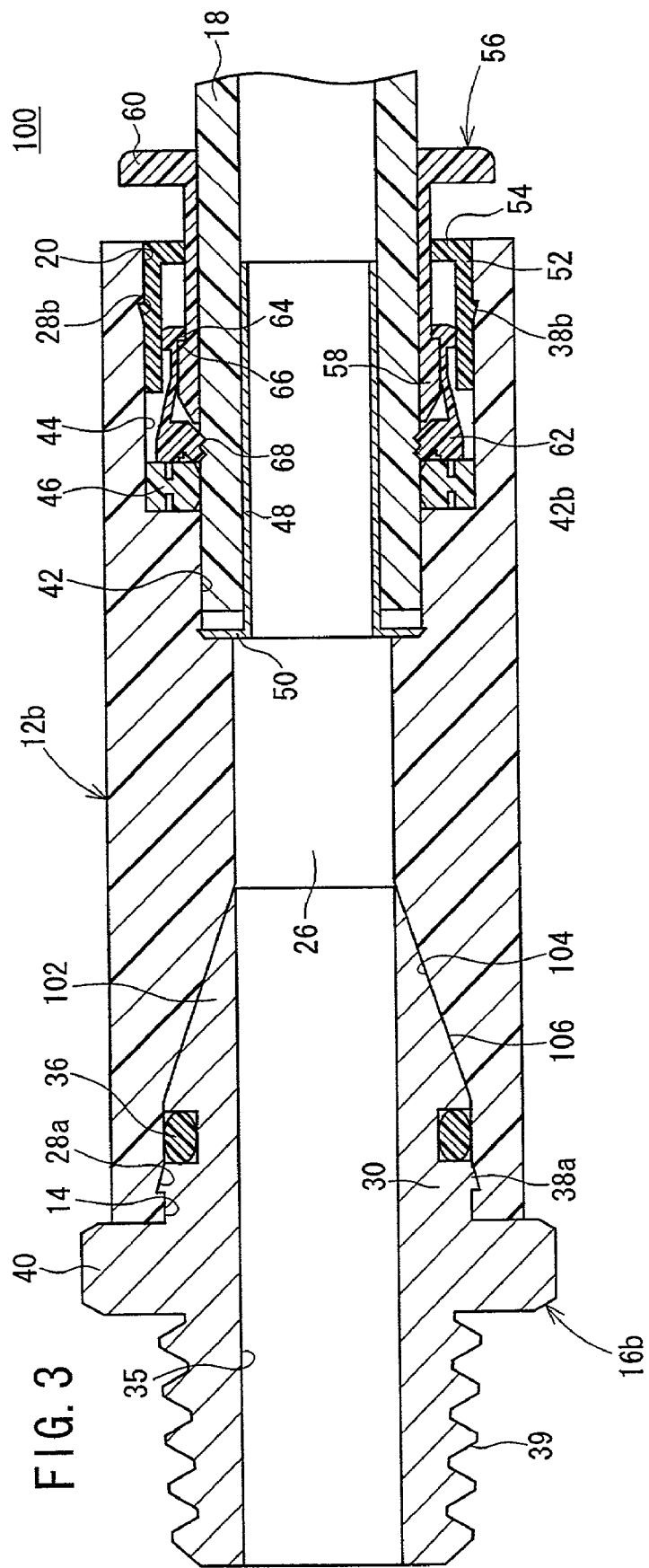
FIG. 3 is a longitudinal sectional view illustrating a tube joint of a second embodiment according to the present invention.

Next, a tube joint 100 according to a second embodiment is shown in FIG. 3. In the second to sixth embodiments described below, the same components as those of the tube joint 10 according to the first embodiment described above are designated by the same reference numerals, detailed explanation of which will be omitted.

As shown in FIG. 3, the tube joint 100 according to the second embodiment is different from the tube joint 10 according to the first embodiment in the following points. That is, a tapered section 102, which is inclined by a predetermined angle toward a second opening 20 of a body 12b and which has its gradually reduced diameter, is provided at one end of a connecting member 16b to be inserted into the body 12b. An inner circumferential surface 104 of the body 12b has a tapered shape with a diameter gradually reduced while being inclined by a predetermined angle toward the second opening 20. The outer circumferential surface 106 of the tapered section 102 and the inner circumferential surface 104 of the body 12b are of substantially the same shape.

That is, when the body 12b is deformed in the downward direction by the external force applied to the other end of the body 12b, the outer circumferential surface 106 of the tapered section 102 is pressed downwardly and deformed in conformity with the inner circumferential surface 104 of the body 12b. In this situation, the external force exerted on the body 12b is suitably dispersed by the surface-to-surface contact between the inner circumferential surface 104 of the body 12b and the outer circumferential surface 106 of the tapered section 102 having substantially the same shape as that of the inner circumferential surface 104. The stress generated near the connecting portion between the connecting member 16a and the body 12b is mitigated. As a result, the durability of the body 12b is not affected. Therefore, it is possible to improve the durability of the tube joint 100.

Figure 4:
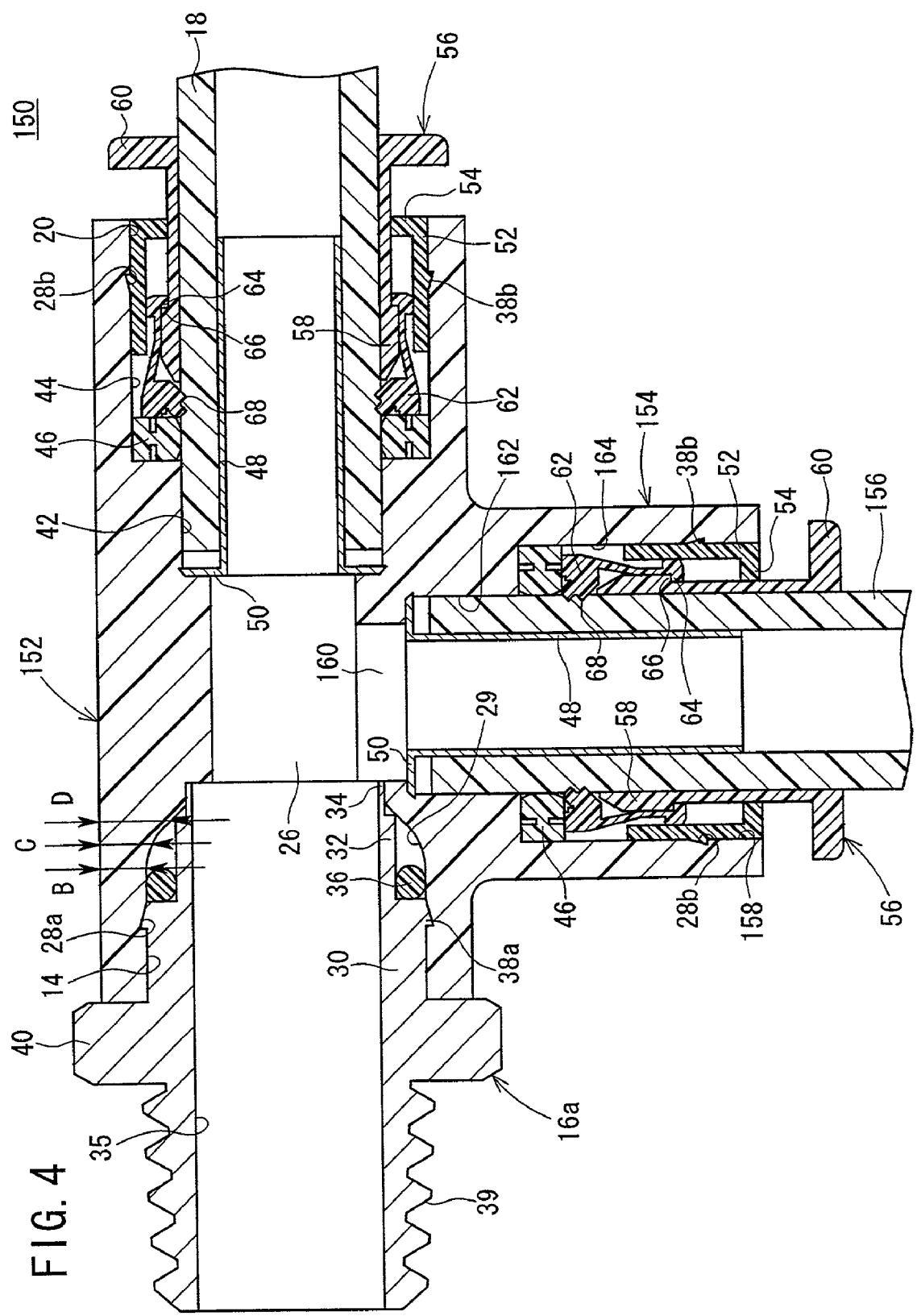
FIG. 4 is a longitudinal sectional view illustrating a tube joint of a third embodiment according to the present invention.
Figure 5:
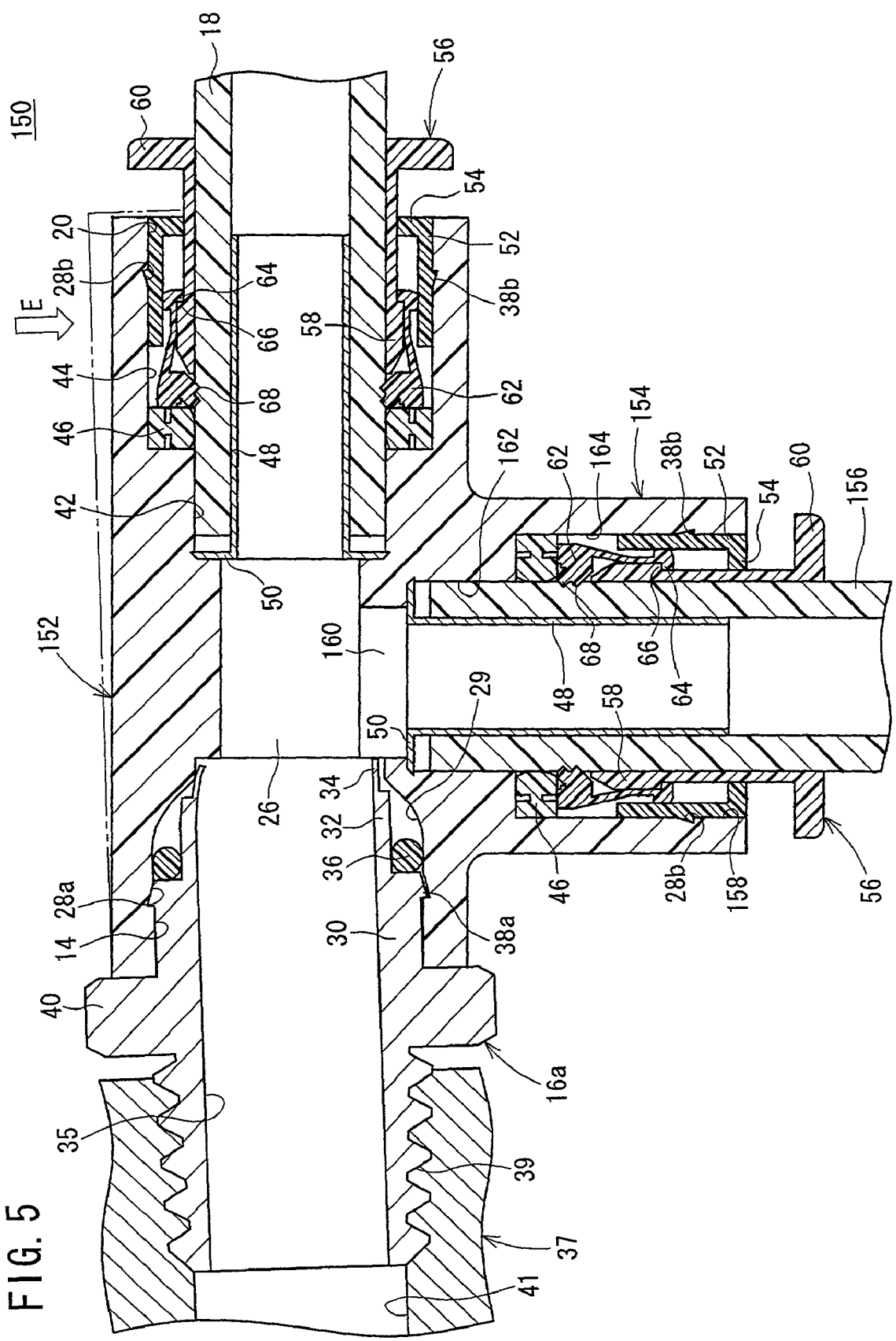
FIG. 5 is a longitudinal sectional view in which external force is applied to the tube joint shown in FIG. 4.

Next, a tube joint 150 according to a third embodiment is shown in FIGS. 4 and 5.

As shown in FIGS. 4 and 5, the tube joint 150 according to the third embodiment is different from the tube joint 10 according to the first embodiment in that a body 152 composed of a resin material is of a substantially T shape to provide a branched section 154 which protrudes vertically downwardly from a central portion of the body 152 and a third opening 158 into which a fluid tube 156 composed of a resin material is inserted for the branched section 154. The body 152 may also have a substantially L shape (elbow type).

A communicating passage 160 extends by a predetermined length to make communication with the third opening 158 in a direction perpendicular to the communicating passage 26 formed in the body 152.

A first step 162 and a second step 164, which are disposed in this order from the communicating passage 160 toward the third opening 158, are formed in the third opening 158 in the same manner as in the second opening 20. A fluid tube 156 is inserted on the outer circumferential surface of a sleeve 48 which is installed therein.

When the external force is applied to the other end at which the second opening 20 of the body 152 is formed, the external force is absorbed by downwardly deforming the first and second deformable sections 32, 34 of the connecting member 16a for the deformation of the body 152. As a result, it is possible to mitigate the stress generated at the connecting portion between the connecting member 16a and the body 152. Therefore, it is possible to improve the durability of the tube joint 150 without affecting the durability of the body 152.

Figure 6:
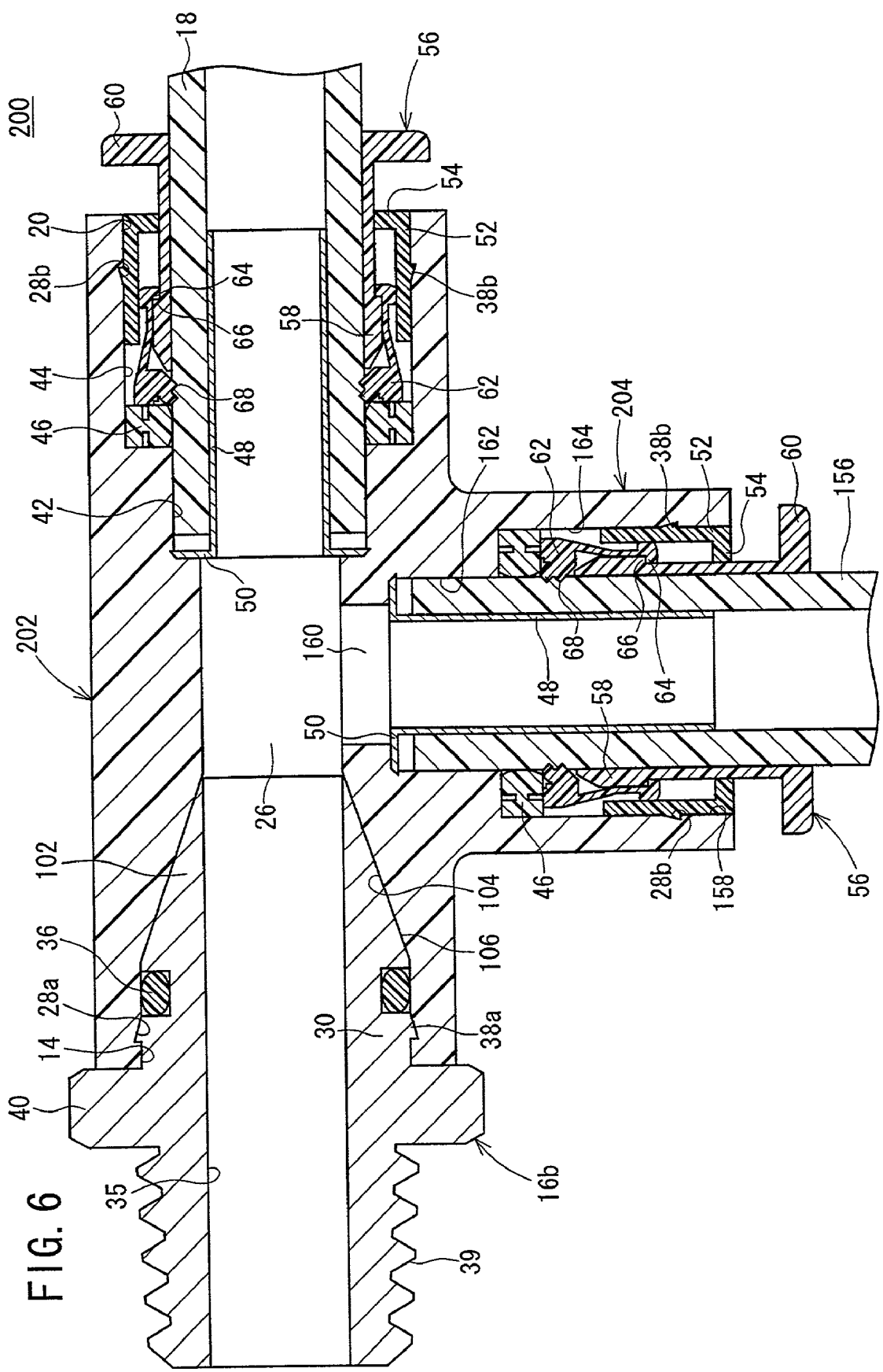
FIG. 6 is a longitudinal sectional view illustrating a tube joint of a fourth embodiment according to the present invention.

Next, a tube joint 200 according to a fourth embodiment is shown in FIG. 6.

As shown in FIG. 6, the tube joint 200 according to the fourth embodiment is different from the tube joint 10 according to the first embodiment in the following points. That is, a body 202 composed of a resin material is of a substantially T shape to provide a branched section 204 which protrudes vertically downwardly from a central portion of the body 202 and a third opening 158 into which a fluid tube 156 composed of a resin material is inserted for the branched section 204. Further, a tapered section 102, which is inclined by a predetermined angle toward a second opening 20 of the body 202 and which has its gradually reduced diameter, is provided at one end of a connecting member 16b to be inserted into the body 202. An inner circumferential surface 104 of the body 202 has a tapered shape with a diameter gradually reduced while being inclined by a predetermined angle toward the second opening 20. The outer circumferential surface 106 of the tapered section 102 and the inner circumferential surface 104 of the body 202 are of substantially the same shape.

When the body 202 is deformed in the downward direction by the external force applied to the other end of the body 202 having the second opening 20, the outer circumferential surface 106 of the tapered section 102 is pressed downwardly and deformed in conformity with the inner circumferential surface 104 of the body 202. As a result, the external force exerted on the body 202 is preferably dispersed by the surface-to-surface contact between the inner circumferential surface 104 of the body 202 and the outer circumferential surface 106 of the tapered section 102. The stress generated near the connecting portion between the connecting member 16b and the body 202 can be mitigated. Accordingly, the durability of the body 202 is not affected, and it is possible to improve the durability of the tube joint 200.

Figure 7:
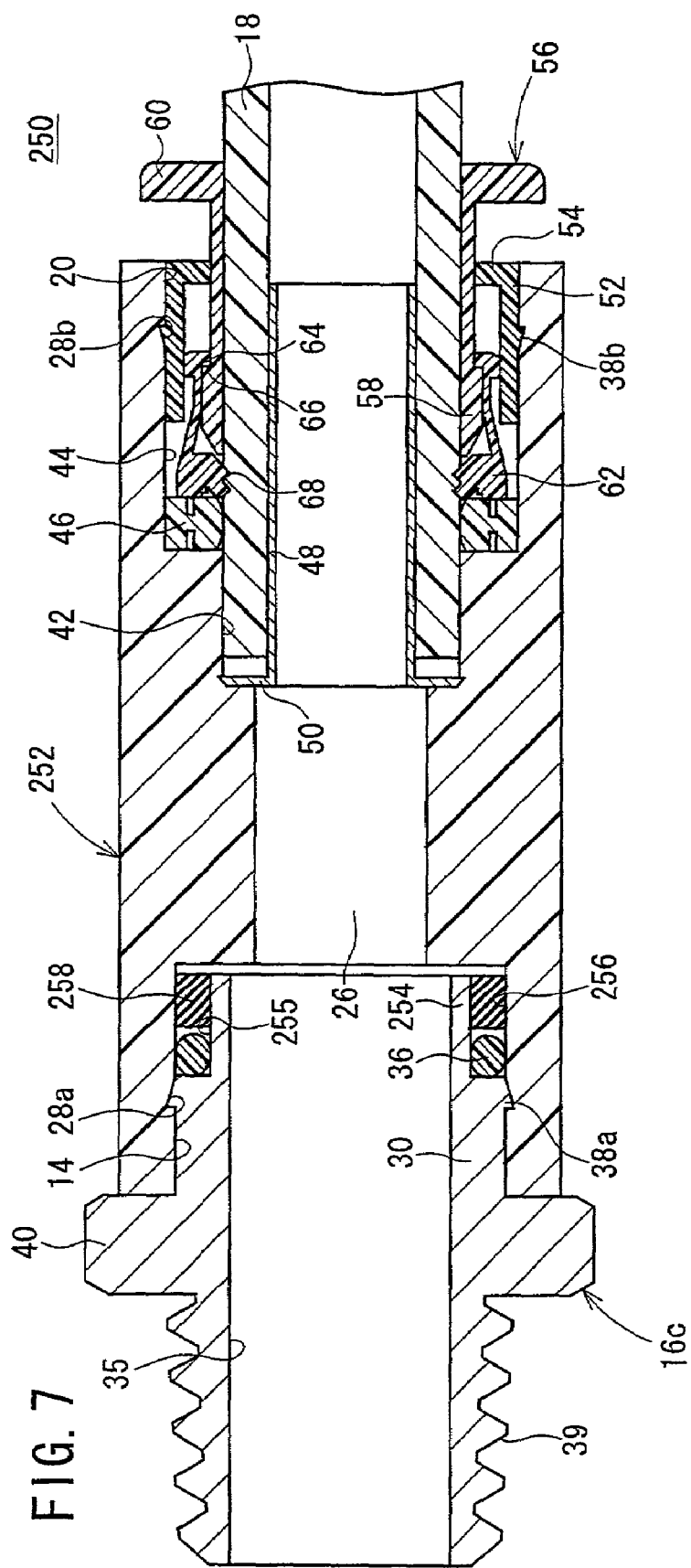
FIG. 7 is, with partial omission, a longitudinal sectional view illustrating a tube joint of a fifth embodiment according to the present invention.
Figure 8:
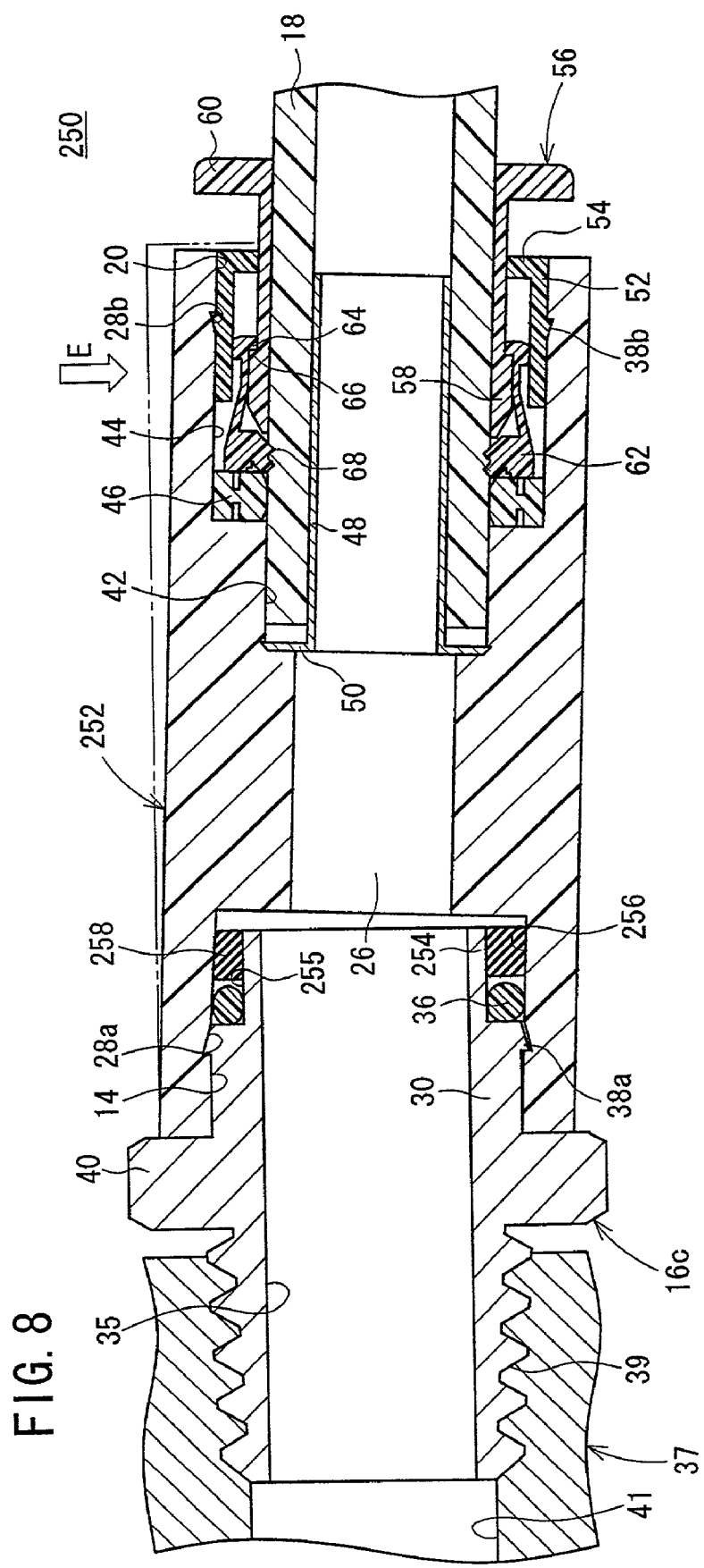
FIG. 8 is, with partial omission, a longitudinal sectional view in which external force is applied to the tube joint shown in FIG. 7.

Next, a tube joint 250 according to a fifth embodiment is shown in FIGS. 7 and 8.

The tube joint 250 according to the fifth embodiment is different from the tube joint 10 according to the first embodiment in that a thin-walled small diameter section 254, which has a diameter smaller than that of the outer circumferential surface of an insert section 30, extends by a predetermined length at one end of a connecting member 16c inserted into a body 252, and an annular elastic member 258 is installed between an outer circumferential surface (outer wall surface) 255 of the small diameter section 254 and an inner circumferential surface 256 of the body 252. The elastic member 258 is formed of, for example, an elastic material such as rubber and sponge.

As shown in FIG. 8, when the external force (arrow E) is applied to the other end having the second opening 20 of the body 252, and the body 252 is deformed downwardly, then the elastic member 258 is pressed and deformed in conformity with the inner circumferential surface 256 of the body 252. As a result, the external force applied to the body 252 is absorbed by the elastic member 258, and thus the external force applied to the small diameter section 254 of the connecting member 16c is mitigated. Further, the deformation of the body 252 is suppressed as well. Therefore, it is possible to mitigate the stress generated near the connecting portion between the connecting member 16c and the body 252. Accordingly, it is possible to improve the durability of the tube joint 250 without affecting the durability of the body 252.

Figure 9:
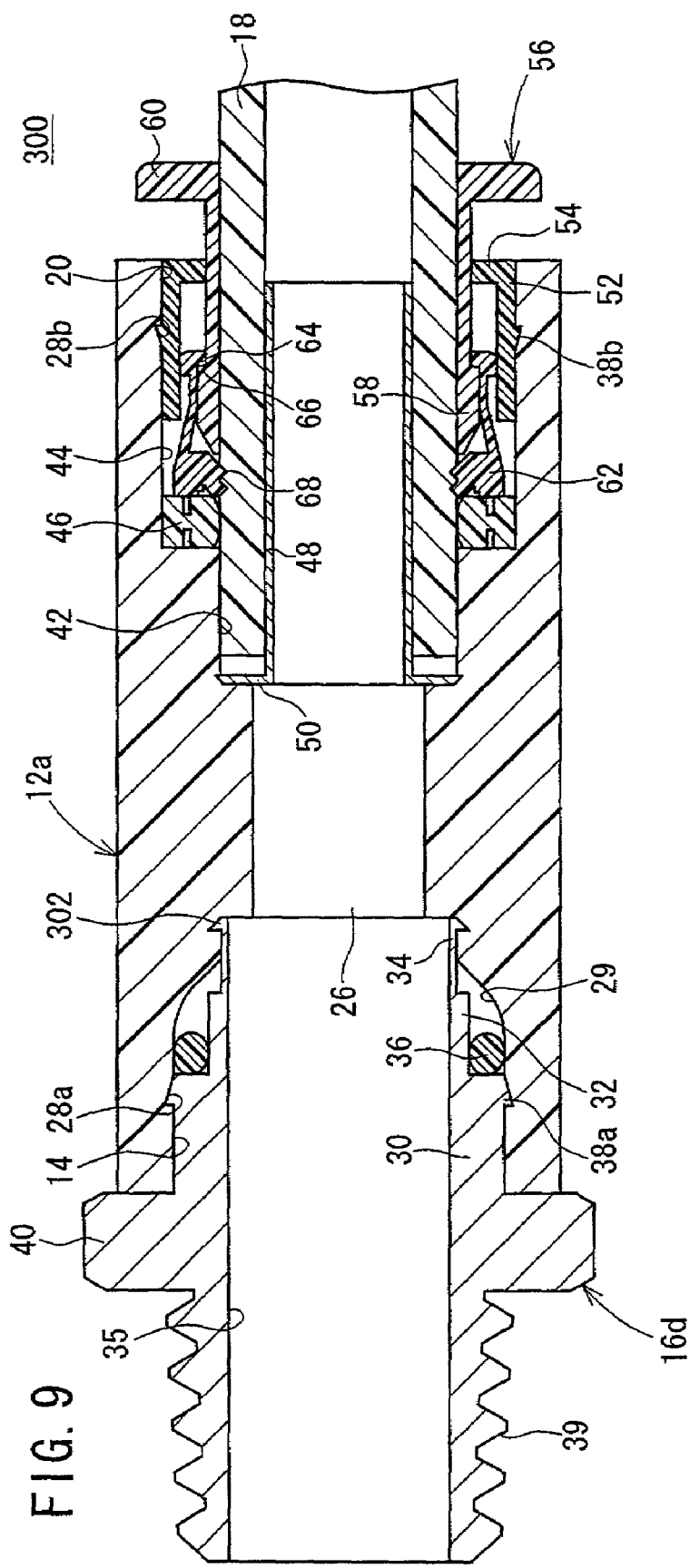
FIG. 9 is, with partial omission, a longitudinal sectional view illustrating a tube joint of a sixth embodiment according to the present invention.
Figure 10:
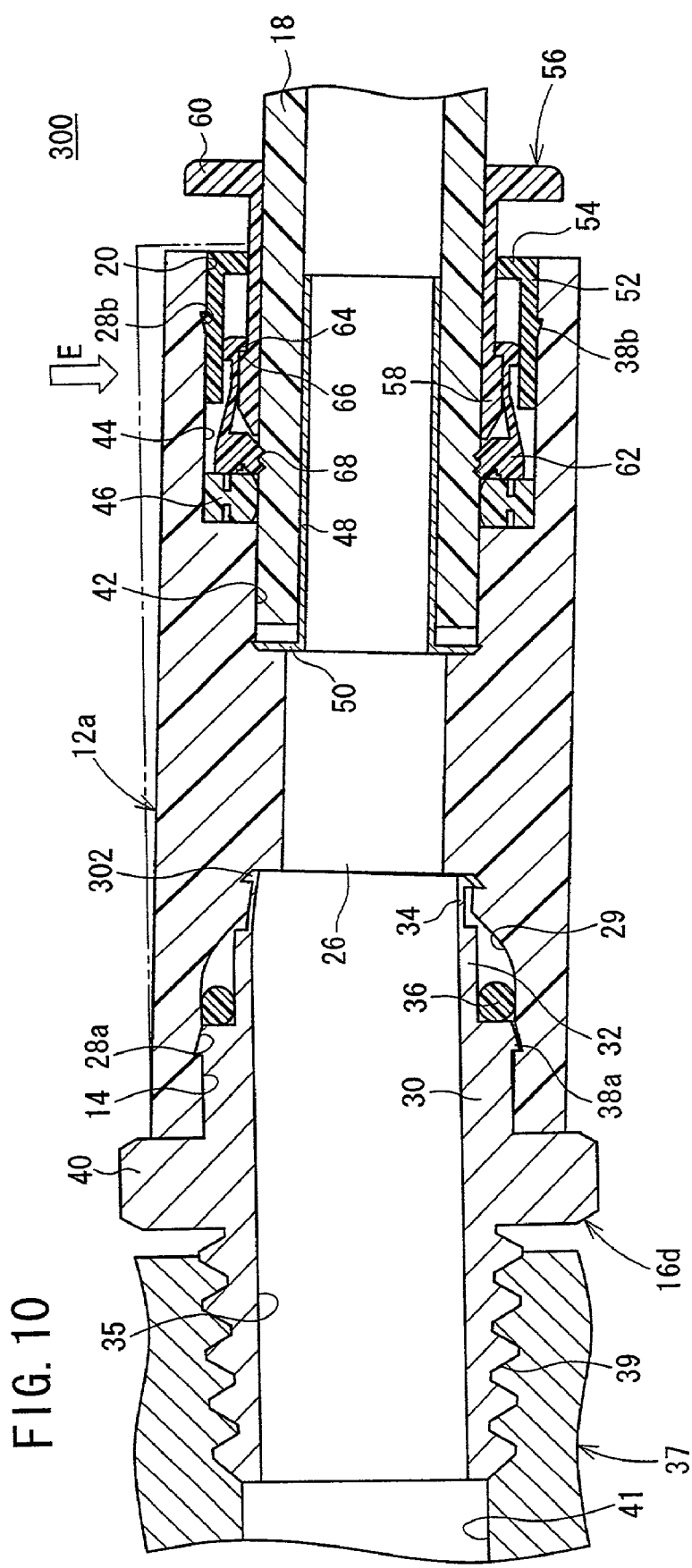
FIG. 10 is, with partial omission, a longitudinal sectional view in which external force is applied to the tube joint shown in FIG. 9.
Figure 11:
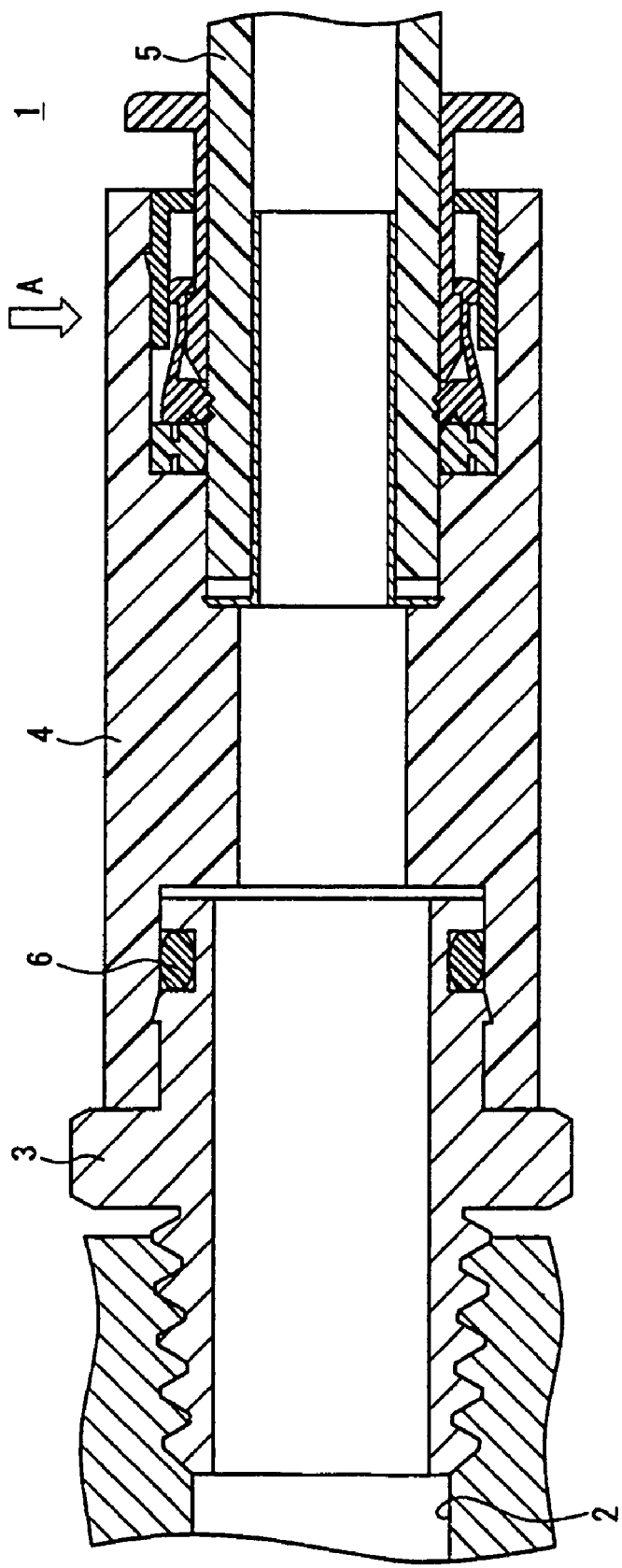
FIG. 11 is a longitudinal sectional view illustrating a conventional tube joint.

Next, a tube joint 300 according to a sixth embodiment is shown in FIGS. 9 and 10.

The tube joint 300 according to the sixth embodiment is different from the tube joint 10 according to the first embodiment in that an edge section (hook section) 302, which protrudes radially outwardly, is formed at a forward end of a second deformable section 34 of a connecting member 16d inserted into a body 12a. The edge section 302 is radially outwardly sharp.

As shown in FIG. 10, when the external force is applied to the other end having the second opening 20 of the body 12a, the body 12a is deformed downwardly together with the inner circumferential surface (inner wall surface) 29 thereof, and the edge section 302 engages the inner circumferential surface 29 of the body 12a by being pressed by the second deformable section 34 under the deforming action. As a result, the axial displacement of the body 12a is suppressed. Therefore, it is possible to mitigate the stress in the downward direction of the body 12a generated near the connecting portion between the connecting member 16d and the body 12a and to mitigate the axial stress of the body 12a. Accordingly, it is possible to improve the durability of the tube joint 300 without affecting the durability of the body 12a.

What is claimed is:

1. A tube joint comprising:
   a joint body which has a fluid passage for allowing a pressure fluid to flow therethrough and which is formed of a resin material;
   an attachment/detachment mechanism for detachably attaching said joint body to a fluid tube;
   a fixing member made of a metal material which has a communicating passage between said fluid passage and a passage provided for a fluid pressure-operated apparatus and which has one end connected to an opening of said joint body and the other end fixed to a port of said fluid pressure-operated apparatus, wherein said fixing member includes an annular stepped portion;
   a sealing ring disposed on said annular stepped portion of said fixing member between said fixing member and the opening of said joint body, and wherein said sealing ring is not provided in an annular groove in said joint body; and
   a stress-mitigating mechanism which is provided at a site of connection between said joint body and said fixing member and which avoids concentration of stress on said site of connection exerted by any external force when said external force is applied to said joint body, wherein a wall thickness at a terminal location of said one end of said fixing member is formed such that said wall thickness at said terminal location is maximally thin-walled as compared with any other portions of said fixing member, and
   wherein said one end of said fixing member is connected to said opening of said joint body, said one end of said fixing member being sufficiently thin-walled and formed of a metal material capable of elastic deformation, so that said one end is deformable with respect to other portions of said fixing member that are not deformed, when said joint body is subjected to said external force.

2. The tube joint according to claim 1, wherein said one end of said fixing member has a uniform wall thickness within a predetermined range in an axial direction.

3. The tube joint according to claim 1, wherein said communicating passage of said fixing member has a substantially constant inner diameter, and said fixing member is formed such that said wall thickness is gradually thin-walled progressively toward said attachment/detachment mechanism until reaching said maximally thin-walled portion at said terminal location of said one end.

4. The tube joint according to claim 1, wherein an inner wall surface of said opening of said joint body connected to said fixing member has a substantially circular arc-shaped cross section in a longitudinal sectional view of said joint body, a diameter of said opening is gradually reduced toward said attachment/detachment mechanism, and a wall thickness of said joint body in a vicinity of said opening is gradually thicker toward said attachment/detachment mechanism.

5. The tube joint according to claim 1, wherein a hook section, which is engageable with an inner wall surface of said joint body, is formed at said one end of said fixing member.

6. The tube joint according to claim 1, wherein said joint body has a cylindrical configuration extending in an axial direction.

7. The tube joint according to claim 6, wherein said joint body has a branched section which protrudes from said cylindrical configuration.

8. The tube joint according to claim 1, wherein said one end of said fixing member is connected to said opening of said joint body such that said terminal location of said one end of said fixing member is in contact with an inner wall surface of said joint body.

* * * * *